(12) United States Patent
Ryu et al.

(10) Patent No.: US 7,529,917 B2
(45) Date of Patent: May 5, 2009

(54) METHOD AND APPARATUS FOR INTERRUPT HANDLING DURING LOOP PROCESSING IN RECONFIGURABLE COARSE GRAINED ARRAY

(75) Inventors: Soo Jung Ryu, Cheonan-si (KR); Jeong Wook Kim, Seongnam-si (KR); Dong-Hoon Yoo, Suwon-si (KR); Hee Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 11/519,858

(22) Filed: Sep. 13, 2006

(65) Prior Publication Data

US 2007/0162729 A1 Jul. 12, 2007

(30) Foreign Application Priority Data

Jan. 11, 2006 (KR) ...................... 10-2006-0003018

(51) Int. Cl.
*G06F 9/00* (2006.01)
(52) U.S. Cl. .......................... 712/241; 712/15; 712/16; 712/244

(58) Field of Classification Search ............. 712/10–22, 712/244, 241, 218
See application file for complete search history.

(56) References Cited

U.S. PATENT DOCUMENTS

| 4,553,203 | A | * | 11/1985 | Rau et al. | ..................... 712/25 |
| 5,481,723 | A | * | 1/1996 | Harris et al. | ................. 717/160 |
| 6,178,499 | B1 | * | 1/2001 | Stotzer et al. | ............... 712/241 |
| 6,378,022 | B1 | * | 4/2002 | Moyer et al. | ................ 710/260 |

OTHER PUBLICATIONS

Reconfigurable computing, Wikipedia article, author unknown, version as existed on Dec. 15, 2005.*

* cited by examiner

*Primary Examiner*—Richard Ellis
(74) *Attorney, Agent, or Firm*—Sughrue Mion, PLLC (57) ABSTRACT

A processor including a coarse grained array including a plurality of function units and a plurality of register files, wherein a loop to be executed by the coarse grained array is split into a plurality of sub-loops, and when an interrupt request occurs while executing the sub-loop in the coarse grained array, the interrupt request is processed after the executing of the sub-loop is completed.

30 Claims, 10 Drawing Sheets

```
for(i=0; i<100; i++)
{
    j=i+1;
    k=k*j;
}
```

METHOD AND APPARATUS FOR INTERRUPT HANDLING DURING LOOP PROCESSING IN RECONFIGURABLE COARSE GRAINED ARRAY

CROSS-REFERENCE TO RELATED APPLICATIONS

This application claims priority Korean Patent Application No. 10-2006-0003018, filed on Jan. 11, 2006, in the Korean Intellectual Property Office, the disclosure of which is incorporated herein by reference.

BACKGROUND OF THE INVENTION

1. Field of the Invention

Methods and apparatuses consistent with the present invention relate to a reconfigurable architecture, and more particularly, to efficiently processing an interrupt when an interrupt request occurs while a loop is executed in a coarse grained array.

2. Description of the Related Art

Traditionally, an apparatus performing an operation is embodied by hardware or software. For example, when a network controller performing a network interface is embodied on a computer chip, the network controller is able to perform only a network interface function defined during fabrication by a manufacturer. After the network controller is fabricated, it is not possible to change the function of the network controller. On the other hand, for example, a program for executing a desired function is programmed and the program is executed by a general purpose processor, thereby satisfying a purpose for a user. In the method of using software, a new function may be performed by changing the software after fabricating hardware in a factory. When software is used, various functions may be performed by using a given hardware but there is a drawback of a lower speed than when hardware is exclusively used.

To overcome the problem of the described method of using hardware and software, there is provided a reconfigurable architecture. The reconfigurable architecture can be customized to solve any problem, after device fabrication, and can exploit a large degree of spatially customized computation in order to perform their computation.

Figure 1:
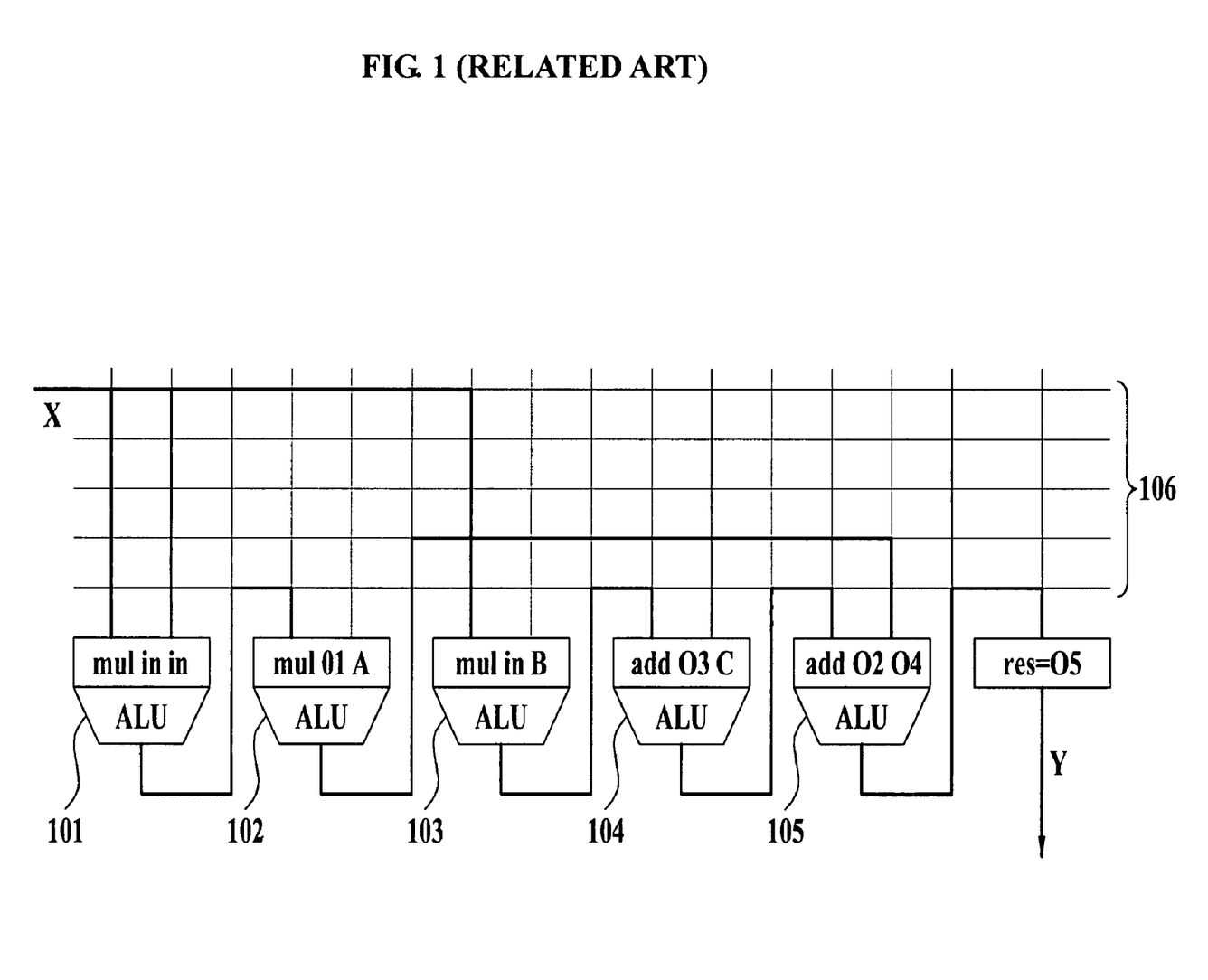
FIG. 1 is a diagram illustrating a reconfigurable architecture in a related art art.

FIG. 1 is a diagram illustrating an example of a related art reconfigurable architecture. A plurality of arithmetic and logic units (ALUs) 101, 102, 103, 104, and 105 are connected a plurality of lines 106 to form a field programmable gate array (FPGA). The FPGA is configured to compute "A*x*x+B*X+C," as an example. If the operation of "A*x*x+B*X+C" frequently occurs, an FPGA as shown in FIG. 1 is configured to perform the operation, thereby more quickly performing the operation than the method of using software. Also, a configuration of the FPGA may be changed by applying a current to the lines 106 of the ALUs. Therefore, a configuration for computing another operation may be formed by using the lines. As described above, a reconfigurable architecture is architecture capable of performing a new operation by changing a hardware configuration after fabrication.

In FIG. 1, data is input to an ALU one bit at a time. This kind of reconfigurable architecture is called as a fine grained array. If data is input to a processing element by units of one word at a time, we call this kind of reconfigurable architecture a coarse grained array (CGA).

Figure 2:
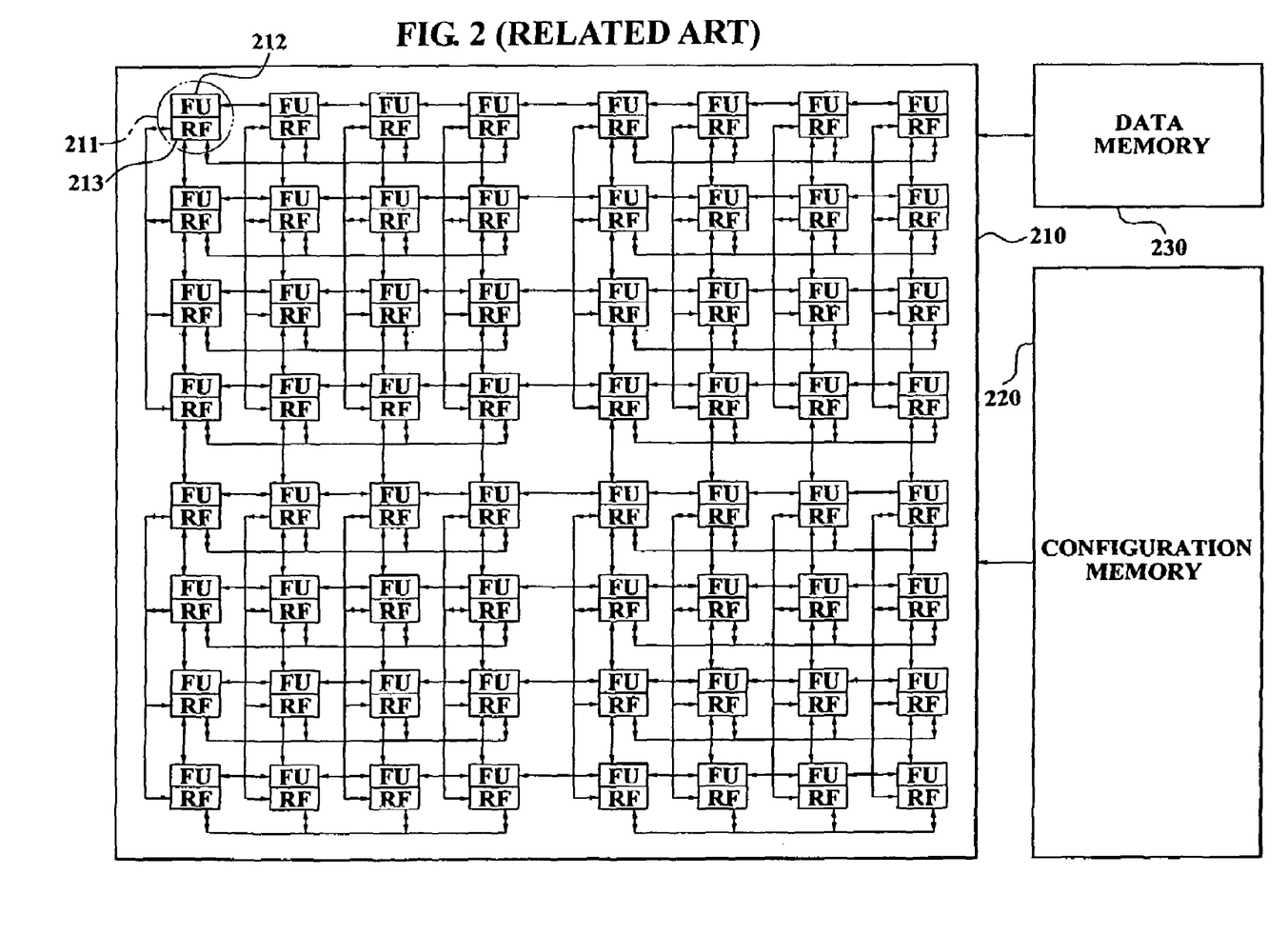
FIG. 2 is a diagram illustrating an example of a coarse grained array in a related art art.

FIG. 2 is a diagram illustrating an example of a related art tightly-coupled coarse grained array architecture.

A coarse grained array 210 includes a plurality of processing elements 211. Each of the plurality of processing elements 211 includes a function unit (FU) 212 and a register file (RF) 213. The function unit 212 performs computations, and the register file 213 is a group of registers temporarily storing data used by the function unit 212.

A configuration memory 220 stores information associated with a configuration of the coarse grained array 210. According to the configuration stored in the configuration memory 220, the coarse grained array 210 changes a connection state between processing elements included in the coarse grained array 210. A data memory 230 is located outside the coarse grained array 210 and stores data.

Figure 3:
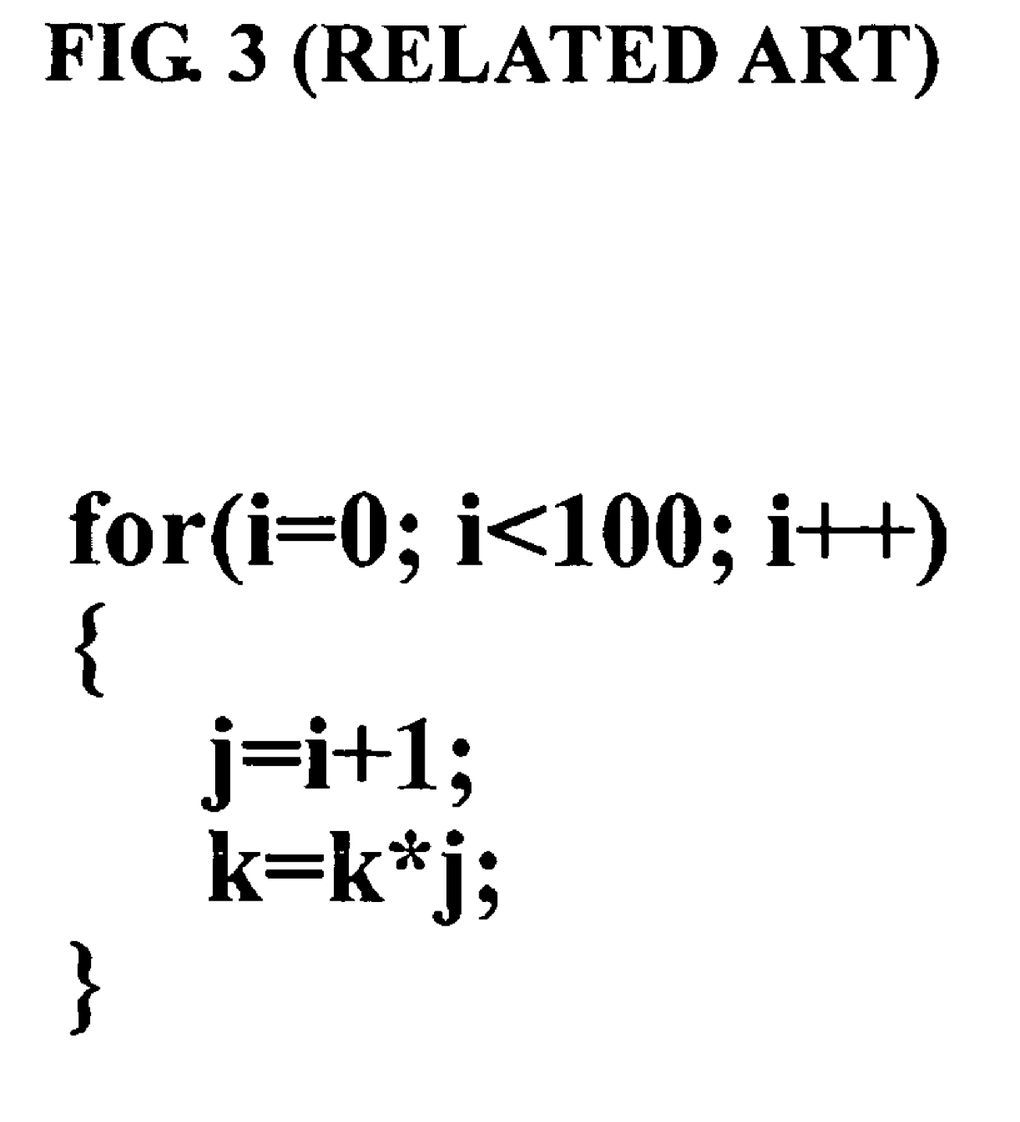
FIG. 3 is a diagram illustrating an example of a program including a loop.

FIG. 3 is a diagram illustrating an example of a program including a loop. Since, in the case of the loop of FIG. 3, an identical computation is repeated, if the loop is executed in a coarse grained array, a total processing efficiency is increased.

However, when an interrupt request occurs while a loop operation is executed in the coarse grained array, it is difficult to process the interrupt. When an interrupt request occurs in a general computer architecture, a current context including a currently stored value is stored in a memory, a processing according to the interrupt is performed, the context stored in the memory is restored, and an operation originally executed is restarted. Namely, if an interrupt request occurs, a context switching may be required. The context indicates a current state and condition of a system and may include values stored in a register.

However, since the coarse grained array includes many register files as shown in FIG. 2, to store the values stored in the many register files in a memory, an amount of overhead becomes very large. Namely, it takes a relatively long time to store the values stored in the many register files to the memory. Also, to include a line for connecting each of the register files to a data memory, an overall design is very complex. As described above, the related art technology cannot provide any solution for a considerable overhead occurring in the coarse grained array to process the interrupt requiring the context switch. Particularly, it becomes more critical when a process to be performed by an interrupt has a constraint that the process must be performed in real-time.

Accordingly, a method of efficiently processing an interrupt occurring in a processor including a coarse grained array is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus efficiently processing an interrupt occurring in a processor including a coarse grained array.

The present invention also provides a method and apparatus satisfying a real-time constraint of interrupt handling even when an interrupt request occurs when a loop is being executed in a coarse grained array.

The present invention also provides a method and apparatus storing a small amount of data in a memory though an interrupt to be processed requires a context switch, thereby reducing an overhead occurring in a context switching of a processor including a coarse grained array.

The present invention also provides a method and apparatus maintaining an amount of data that has to be stored in a context switch to be small, even when a size of a coarse grained array becomes large.

The present invention also provides a method and apparatus minimizing sizes of configurations increased due to splitting a loop performed in a coarse grained array into a plurality of sub-loops, thereby reducing a size of a configuration memory additionally required for storing configurations of the sub-loop.

According to an aspect of the present invention, there is provided a processor including a coarse grained array including a plurality of function units and a plurality of register files, wherein a loop to be executed by the coarse grained array is split into a plurality of sub-loops according to a predetermined rule, and when an interrupt request occurs while the plurality of sub-loops are executed in the coarse grained array, an interrupt corresponding to the interrupt request is processed after executing the sub-loop is completed.

The processor may further include a storage device located outside the coarse grained array and storing a result value of an execution of the sub-loop after the execution of the sub-loop is completed. As the storage device, a central register file may be used or various storage devices such as a memory or buffer may be used.

When a context switching is required for processing the interrupt, a result value of an execution of the sub-loop may be stored into a memory located outside the coarse grained array and the interrupt is processed after completing the execution of the sub-loop.

The processor may further include a configuration memory storing information associated with a configuration of the coarse grained array. The configuration memory may store configurations for executing the plurality of sub-loops in order for the coarse grained array to execute the plurality of sub-loops. In this case, a configuration for executing one of the plurality of sub-loops includes at least one sub-configuration, and the at least one sub-configuration that is common in the configurations with respect to each of the plurality of sub-loops is stored in the same location of the configuration memory.

According to another aspect of the present invention, there is provided a processor including a coarse grained array including a plurality of function units and a plurality of register files, wherein, when an interrupt request occurs while a loop is executed in the coarse grained array and a number of iterations left to complete the loop is less than a predetermined number, an interrupt corresponding to the interrupt request is processed after executing the loop.

According to still another aspect of the present invention, there is provided a processor including a coarse grained array including a plurality of function units and a plurality of register files, wherein, when an interrupt request occurs while a loop is executed in the coarse grained array and a number of iterations left to complete the loop is more than a predetermined number, an execution of the loop is suspended and an interrupt corresponding to the interrupt request is processed.

According to yet another aspect of the present invention, there is provided a method of processing an interrupt in a coarse grained array, the method including: splitting a loop to be executed by the coarse grained array into a plurality of sub-loops according to a predetermined rule; and waiting until an execution of the plurality of sub-loops is completed and then processing an interrupt corresponding to an interrupt request that occurs while the plurality of sub-loops is executed in the coarse grained array.

The waiting includes: storing a result value of the execution of the sub-loop into a central register file located outside the coarse grained array after executing the plurality of sub-loops; and processing the interrupt.

BRIEF DESCRIPTION OF THE DRAWINGS

The above and/or other aspects of the present invention will become apparent and more readily appreciated from the following detailed description of exemplary embodiments, taken in conjunction with the accompanying drawings of which.

DETAILED DESCRIPTION OF EXEMPLARY EMBODIMENTS

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

When an interrupt request occurs in a coarse grained array (CGA), all coarse grained array operations currently performed are invalidated, interrupt processing is completed, and the coarse grained array operations are performed from a beginning again. For example, an interrupt request occurs when the coarse grained array executes a loop operation at i=50 from the loop of FIG. 3, the interrupt is processed, and the loop operations is executed from i=0. According to this method, a real-time constraint of a process required by the interrupt request is satisfied since an interrupt is quickly performed. However, when the coarse grained array has already executed many loops, since results of the loop operations are all invalidated, a computing power is wasted, and when there is a real-time constraint on a current process that was interrupted and invalidated while being performed, the real-time constraint on the process may not be satisfied.

As another method, when an interrupt request occurs in a coarse grained array, processing the interrupt is blocked until execution of an operation currently being executed is completed. For example, an interrupt request occurs when a coarse grained array executes a loop operation at i=50 from the loop of FIG. 3, the loop operation is continuously executed until i=99 and completed, and then the interrupt is processed. According to this method, since results of the loop operation performed in the coarse grained array are not invalidated, the computing power is efficiently utilized. However, if a time required for the loop operation becomes long, a real-time restraint on a process to be performed for an interrupt may not be satisfied. Particularly, if a task that has to be newly executed for the interrupt is a real-time application, such as reproducing a moving picture, the present method may give a great inconvenience to users.

Accordingly, a processor according to an exemplary embodiment of the present invention includes a coarse grained array including a plurality of function units and a plurality of register files. When an interrupt request occurs while the coarse grained array executes a loop, if a number of iterations remaining until an end of the loop is less than a predetermined count, the interrupt request is processed after execution of the loop is completed. For example, the present exemplary embodiment may be selected when a real-time constraint of a process to be performed for the interrupt is satisfied even though a remaining number of iterations to complete the loop is executed.

A processor according to another exemplary embodiment of the present invention includes a coarse grained array including a plurality of function units and a plurality of register files. When an interrupt request occurs while the coarse grained array executes a loop, if a remaining number of iterations to complete the loop is more than a predetermined number, execution of the loop is suspended and the interrupt is processed. For example, the present exemplary embodiment may be selected when a real-time constraint of a process to be performed for the interrupt is not satisfied if the remaining number of iterations to complete the loop is executed.

Figure 4:
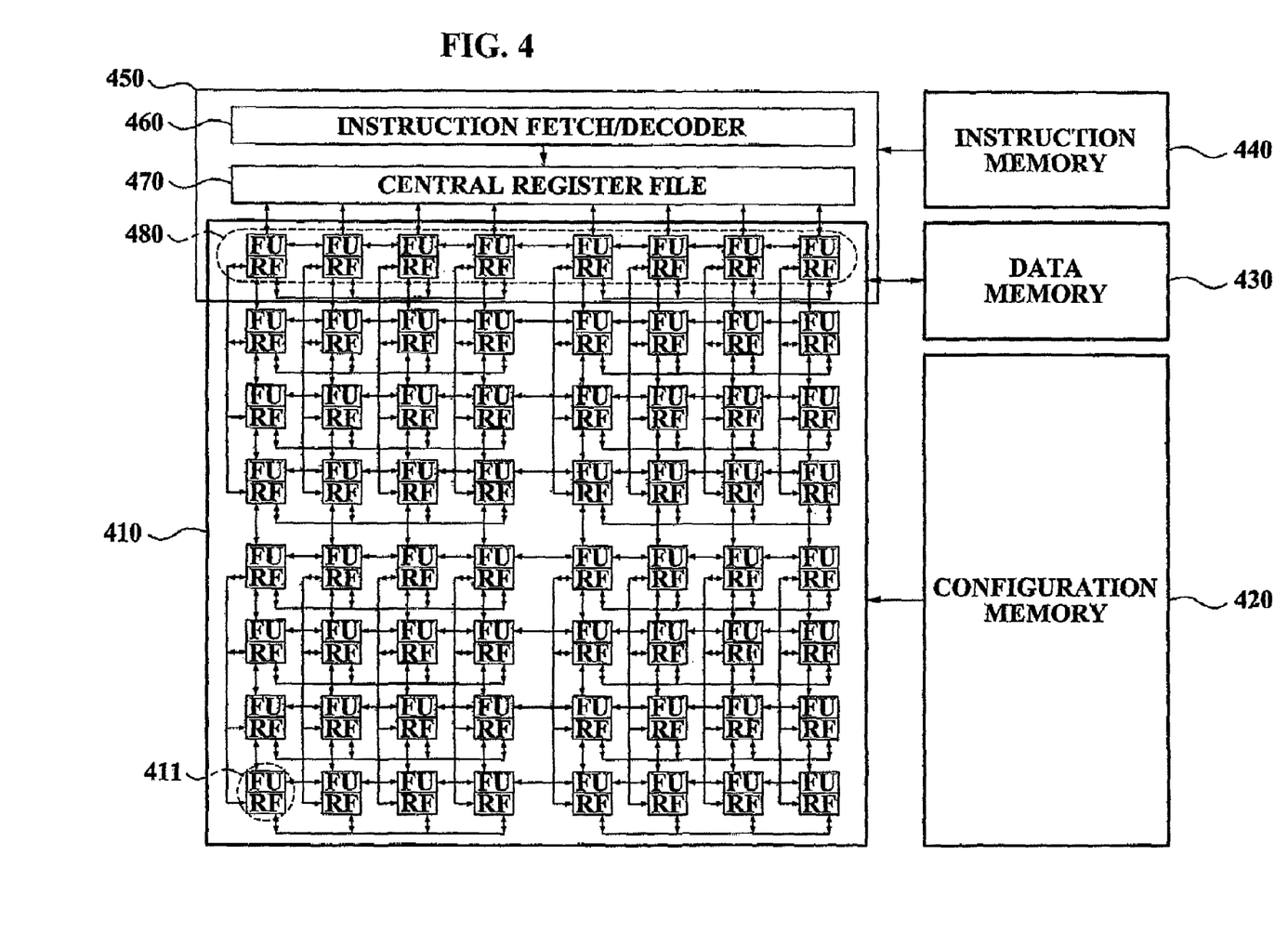
FIG. 4 is a diagram illustrating a processor including a coarse grained array according to an exemplary embodiment of the present invention.

FIG. 4 is a diagram illustrating a processor including a coarse grained array 410 according to an exemplary embodiment of the present invention.

Referring to FIG. 4, the coarse grained array 410 includes a plurality of processing elements 411. Each processing element 411 includes a function unit (FU) and a register file (RU). The function unit performs calculations. The register file is an aggregate of registers and temporarily stores data used in the function unit.

A configuration memory 420 stores information associated with a configuration of the coarse grained array 410. Accordingly to the configuration stored in the configuration memory 420, the coarse grained array 410 changes a data path between the processing elements 411. Also, according to an exemplary embodiment of the present invention, according to the configuration stored in the configuration memory 420, the coarse grained array 410 defines a function that is performed by the processing elements 411 as well as the data path between the processing elements 411. For example, a function unit included in a processing element 411 may be defined to be a function unit performing an addition operation and may be changed into a function unit performing a multiplication operation.

Since an identical computation is repeated in a loop operation, the configuration of the coarse grained array 410 is changed by one configuration stored in the configuration memory 420 and the loop operation is repeatedly performed. When a new loop operation has to be performed after completing the loop operation, the configuration of the coarse grained array 410 is changed into an configuration for executing the new loop operation. As described above, the configuration memory 420 stores the information with respect to the configuration of the coarse grained array 410.

A data memory 430 is located outside the coarse grained array 410 and stores data. An instruction memory 440 is located outside the coarse grained array 410 and stores instructions.

A central register file 470 is located outside the coarse grained array 410 and stores a result value computed in the coarse grained array 410 and intermediate result values.

A processor using a coarse grained array may include the coarse grained array and another host processor (not shown) as a processing unit. In this case, general instructions may be executed in the host processor and instructions requiring repeated execution, such as a loop, may be executed in the coarse grained array. A configuration in which the coarse grained array is separated from the host processor, as the configuration described above, may be called as a loosely-coupled configuration.

On the other hand, the processor shown in FIG. 4 may enable some processing elements 480 from the processing elements 411 of the coarse grained array 410 to function as a host processor. Accordingly, the general instructions are executed in the processing elements 480 selected from the processing elements 411 of the coarse grained array 410, and the instructions requiring repeated execution, such as a loop, are executed in the total coarse grained array 410 including the processing elements 480. A configuration in which some processing elements from processing elements of a coarse grained array function as a host processor, as the configuration described above, may be called as a tightly-coupled configuration. In a tightly-coupled configuration, both of an array mode and an instruction set processor mode may be used in one processor. In the array mode, the function units of the coarse grained array 410 operate according the configuration stored in the configuration memory 420. Accordingly, in the array mode, the processing elements 480 operate as a part of the coarse grained array 410. In the instruction set processor mode, the function units of the processing elements 480 operate. For example, in the instruction set processor mode, only the processing elements 480 of the coarse grained array 410 operate and other processing elements do not operate.

When using the described tightly-coupled configuration, since some of processing elements used in a coarse grained array are used as a host processor, there is no need to employ an additional host processor. Therefore, a size of a processor may be reduced and an overhead caused by data transfer between processors may be reduced.

Also, when the processing elements 480 of the coarse grained array 410 are used as a host processor, a very long instruction word (VLIW) architecture may be used. In this case, an instruction fetch/decoder 460, the central register file 470, and the processing elements 480 form a VLIW architecture 450.

Though a tightly-coupled configuration using a coarse grained array is described in the present exemplary embodiment, the present invention may be applied to a loosely-coupled configuration using a coarse grained array as well as other reconfigurable architectures.

In the processor according to the present exemplary embodiment, a loop that will be executed in the coarse grained array 410 is split into a plurality of sub-loops according to a predetermined standard, and when an interrupt request occurs while the sub-loop is executed in the coarse grained array 410, the interrupt request is processed after execution of the sub-loop is completed.

Figure 5:
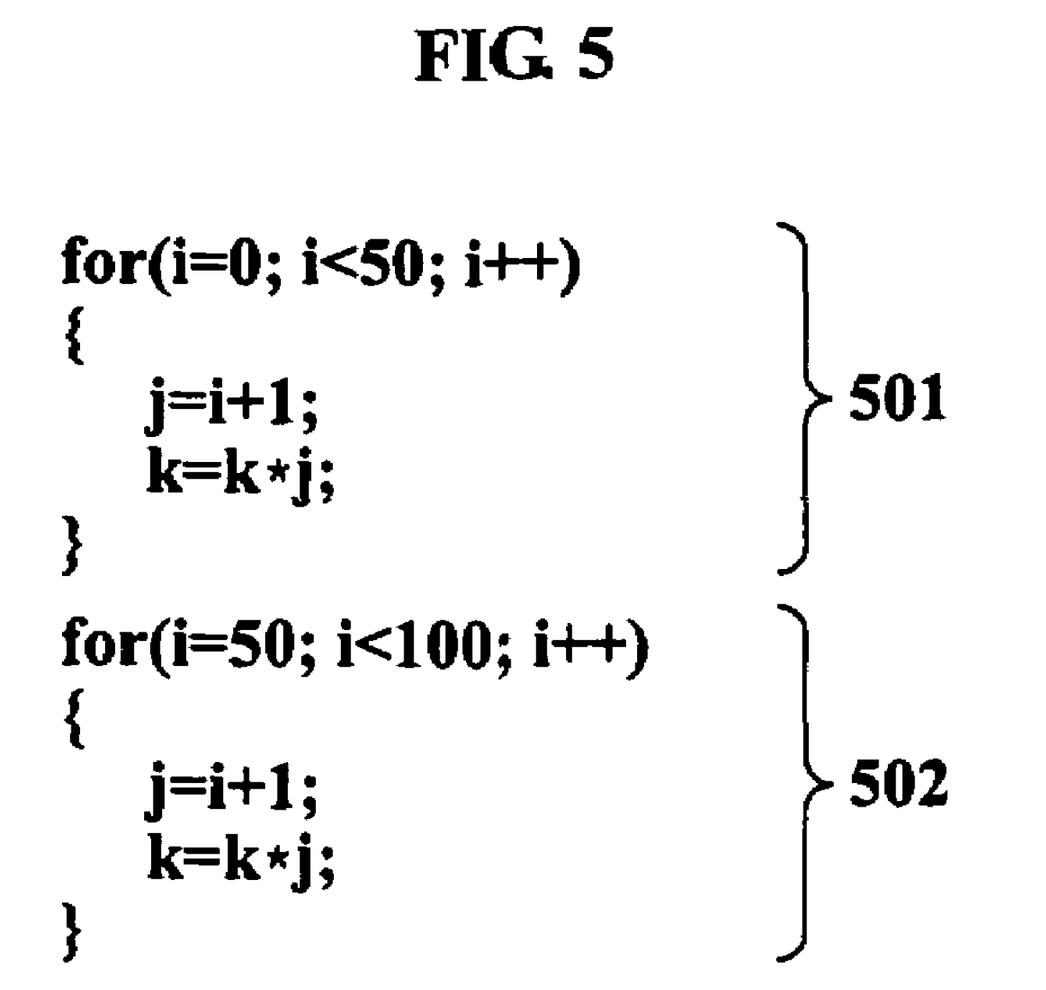
FIG. 5 is a diagram illustrating an example of splitting the loop of FIG. 3 into sub-loops.

FIG. 5 is a diagram illustrating an example of splitting the loop of FIG. 3 into sub-loops. In FIG. 3, the loop is executed from i=0 to i=99. In FIG. 5, the loop of FIG. 3 is split into a first sub-loop 501 executed from i=0 to i=49 and a second sub-loop 502 executed from i=50 to i=99. In FIG. 5, although the loop is split into two sub-loops, a result value of execution is the same as the loop of FIG. 3. Accordingly, executing the loop as shown in FIG. 5 may be equivalent to the loop shown in FIG. 3. To split one loop into N sub-loops as described above is called as a loop iteration split.

When an interrupt request occurs while one large loop is executed in the coarse grained array 410, processing a corresponding interrupt after completing execution of remaining operations which have yet to be executed may not satisfy a real-time constraint of a process of the interrupt. Similarly, since a number of operations already executed is large, invalidating the operations already executed may waste computing power.

To solve the problem, according to the present exemplary embodiment, a loop that will be executed in the coarse grained array is split into a plurality of sub-loops according to a predetermined standard. In this case, a size of the sub-loop is determined so that a time required in executing the sub-loop is not larger than a time required from an occurrence of an interrupt request to processing a corresponding interrupt to completion. Namely, the loop is split into a size capable of satisfying a real-time constraint of the interrupt request though the interrupt request is blocked while the sub-loop is executed. In addition, the size of the sub-loop may be determined according to a sub-loop execution time and an accepted blocking time with respect to an interrupt request. As a simpler method, a sufficient small value, for example, 500 may be used as a number of iterations of the sub-loop. According to an aspect of the present invention as described above, since there is only a small increase in a number of configurations increased due to loop split, an overhead caused by the increase of the number of the sub-loops is very small.

When a loop is split to be executed in the coarse grained array 410 as described above, if an interrupt request occurs while executing a sub-loop in the coarse grained array, though the interrupt request is processed after execution of the sub-loop is completed, a real-time constraint of the interrupt request may be satisfied. Also, since loop operations currently performed are not invalidated, wasted computing power is not significant.

Figure 6:
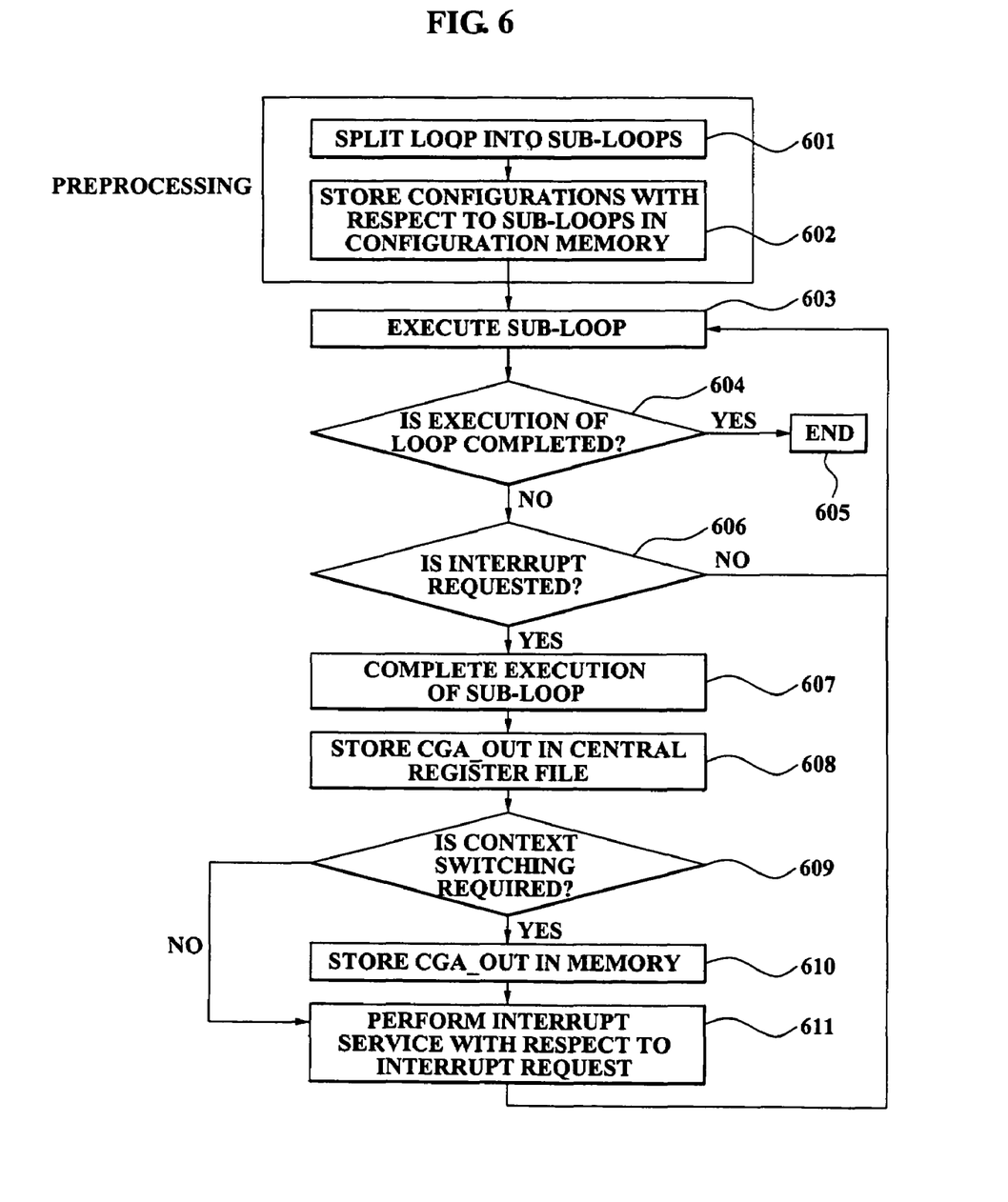
FIG. 6 is a flowchart illustrating an order of processing an interrupt in a coarse grained array, according to an exemplary embodiment of the present invention.

FIG. 6 is a flowchart illustrating an order of processing an interrupt in the coarse grained array, according to an exemplary embodiment of the present invention.

In preprocessing, the processor splits a loop into a plurality of sub-loops in operation 601 and stores configurations with respect to the plurality of sub-loops in the configuration memory 420 in operation 602. When an input program is interpreted and if there is a loop that will be executed in the coarse grained array 410, the processor splits the loop into the plurality of sub-loops according to a predetermined standard in operation 601. Operation 601 may be performed by a compiler at compiling time.

In operation 602, the processor stores the configurations for executing the plurality of sub-loops in the configuration memory 420 so that the plurality of sub-loops may be executed in the coarse grained array 410. When the configuration with respect to the plurality of sub-loops are stored in the configuration memory 420, a method that prevents an increase in a number of configurations, increased due to loop split, may be employed, which will be described later in detail with reference to FIGS. 7 and 8.

In operation 603, the coarse grained array 410 executes the sub-loop. If there is no interrupt request until execution of the sub-loop is completed, the execution of the sub-loop is completed in the coarse grained array in operations 604 and 605.

In operation 606, it is determined whether there is an interrupt request while the sub-loop is executed in the coarse grained array 410. If the interrupt request occurs while the sub-loop is executed in the coarse grained array 410, the coarse grained array 410 executes the sub-loop until completion in operation 607.

Namely, when the interrupt request occurs while the sub-loop is executed in the coarse grained array 410, the processor according to the present exemplary embodiment processes a corresponding interrupt after execution of the sub-loop is completed. In this case, when processing the interrupt after execution of the sub-loop is completed, a result value of the execution of the sub-loop is stored in the central register file 470 located outside the coarse grained array 410.

In operation 608, after the execution of the sub-loop is completed, a result value CGA_OUT of the execution of the sub-loop is stored in the central register file 470 located outside the coarse grained array 410. Namely, after the execution of the sub-loop is completed, all values stored in the register file of the processing elements of the coarse grained array 410 are not stored in the central register file. In the exemplary embodiment of present invention, only values which will be used in executing subsequent sub-loops after the execution of the sub-loop are stored in the central register file 470. Accordingly, according to the present exemplary embodiment, since only values which will be used in subsequent sub-loop that will be executed are stored after execution of one sub-loop is completed, an overhead due to the loop split may be reduced and an interrupt may be processed while reducing an overhead when the interrupt does not require a context switching.

In operation 609, it is determined whether a context switching is required for processing the interrupt. For example, when a new task is performed to process the interrupt and the task has to be performed in the coarse grained array 410, the context switching is required.

When the context switching is required to process the interrupt as a result of the determination of operation 609, the execution of the sub-loop is completed and the result value of the execution of the sub-loop is stored in the data memory 430 located outside the coarse grained array 410 in operation 610. According to the present exemplary embodiment, though an interrupt request occurs while a loop is executed in the coarse grained array 410, since the loop is executed to be completed and only a result value CGA_OUT of execution of the loop is stored in the central register file (470), if a context switching is required, there is no need to store all data of the register files of the processing elements of the coarse grained array 410 and only the result value of the execution of the sub-loop has to be stored in a memory. Since the result value of the execution of the sub-loop is stored in the central register file 470 in operation 608, only the result value of the execution of the sub-loop stored in the central register file 470 has to be stored though a context switching occurs. Accordingly, according to the present exemplary embodiment, though an interrupt request requiring a context switching occurs, an amount of overhead caused by the context switching is not significant.

If the result value CGA_OUT of the execution of the sub-loop is stored in the data memory 430 located outside the coarse grained array 410 in operation 610, a service with respect to the interrupt request is performed in operation 611.

If a context switching for processing the interrupt request is not required as a result of the determination of operation 609, the result value of the execution of the sub-loop is not stored in the data memory located outside the coarse grained array 410 and the service with respect to the interrupt request is performed in operation 611.

According to an exemplary embodiment of the present invention, when an interrupt request occurs while the sub-loop is executed in the coarse grained array 410 in operation 606, operation 609 may be performed before operation 608. When it is determined that a context switching is required in operation 609, the result value CGA_OUT of the execution of the sub-loop is directly stored in a memory in operation 610. When a context switching is not required, the result value CGA_OUT of the execution of the sub-loop is stored in the central register file 470 in operation 608.

Figure 7:
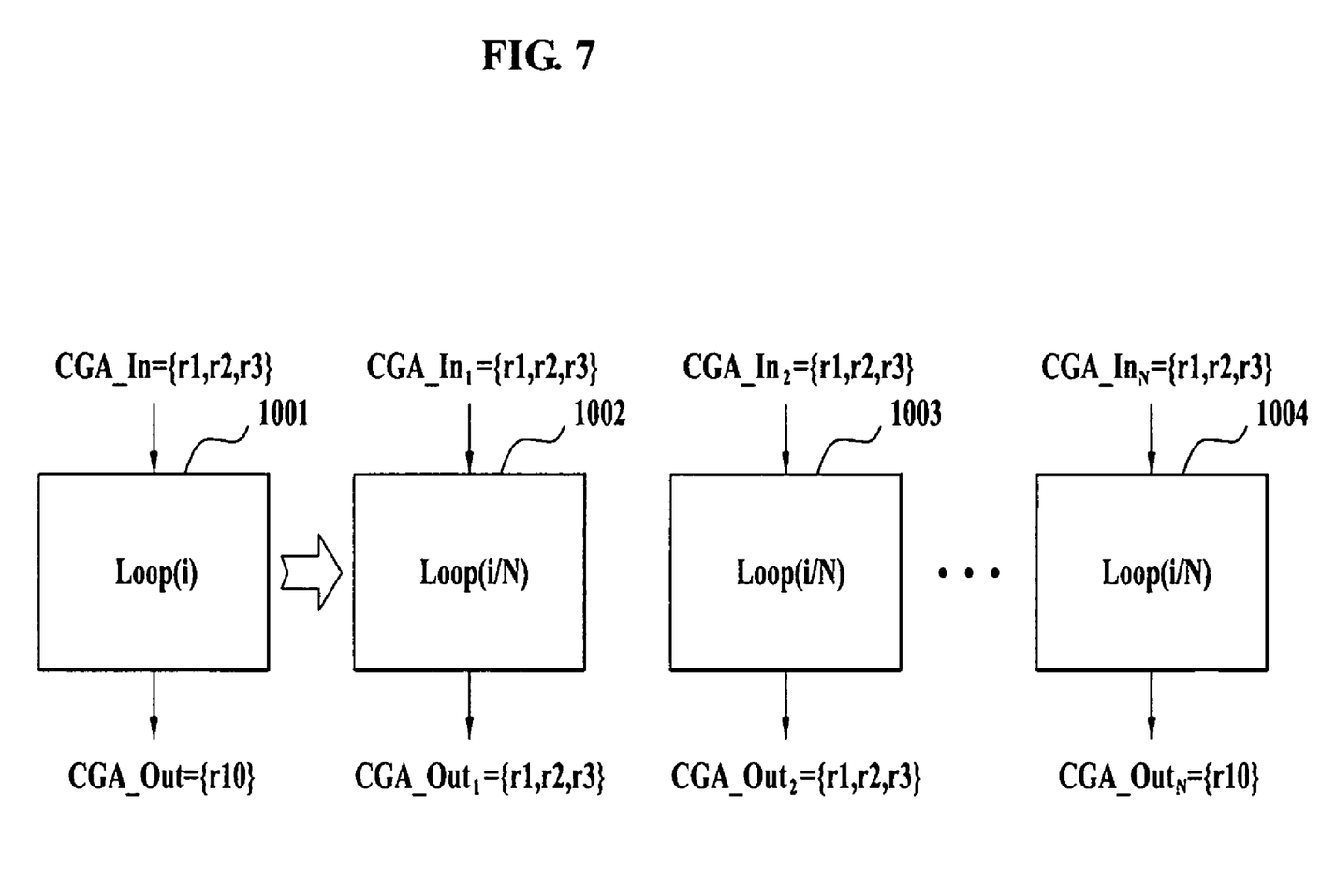
FIG. 7 is a diagram illustrating an example of input/output of each sub-loop in a coarse grained array when a loop is split into sub-loops, according to an exemplary embodiment of the present invention.

FIG. 7 is a diagram illustrating an example of input/output of each sub-loop in a coarse grained array when a loop is split into sub-loops, according to an exemplary embodiment of the present invention. In the case of an original loop 1000, {r1, r2, and r3} is input to a coarse grained array, the loop is executed, and {r10} is output. As a result, a value finally used after the original loop is CGA_OUT={r10}. the original loop 1000 is split into N sub-loops, i.e., a first sub-loop 1001, a second sub-loop is 1002, . . . and an Nth sub-loop 100N. The Nth sub-loop 100N is a last sub-loop.

Referring to FIG. 7, the sub-loops which are not the last sub-loop 100N, namely, from the first sub-loop 1001 to an N-1th sub-loop, may have {r1, r2, and r3} as an input for all of the sub-loops, and may also have {r1, r2, and r3} as an output. With respect to the sub-loops which are not the last sub-loop 100N, a register storing an output value is identical with a register storing an input value. Also, since the sub-loops are made by splitting the same loop, an operation in a loop body is identical with an operation in all of the sub-loops.

In the present exemplary embodiment, to execute the sub-loops made by splitting the loop in the coarse grained array, configurations with respect to the sub-loops are stored in a configuration memory. However, since the sub-loops which are not the last sub-loop, such as the first sub-loop to the N-1th sub-loop, use the same configuration, the common configurations with respect to the sub-loops may be commonly used in other sub-loops.

Accordingly, according to the present exemplary embodiment as described above, though a loop is split, the same configuration may be used with respect to sub-loops which are not a last sub-loop of a loop. Accordingly, since the same configuration may be used with respect to the sub-loops which are not the last, though a number of sub-loops generated by splitting the loop becomes large, a number of configurations for executing the sub-loops is not significantly increased. Accordingly, though a loop is split according to the present exemplary embodiment, a size of a configuration memory for storing configurations of sub-loops is not significantly increased.

On the other hand, since an output of the last sub-loop has to be {r10}, a configuration that is identical with a configuration of other sub-loops may not be used. Accordingly, according to the present exemplary embodiment, when a loop is split into sub-loops, since only a configuration with respect to a last sub-loop and a configuration with respect to sub-loops which are not the last sub-loop have to be stored, though a number of the sub-loops becomes increased, a number of configurations which have to be stored in a configuration memory is not significantly increased.

Figure 8A:
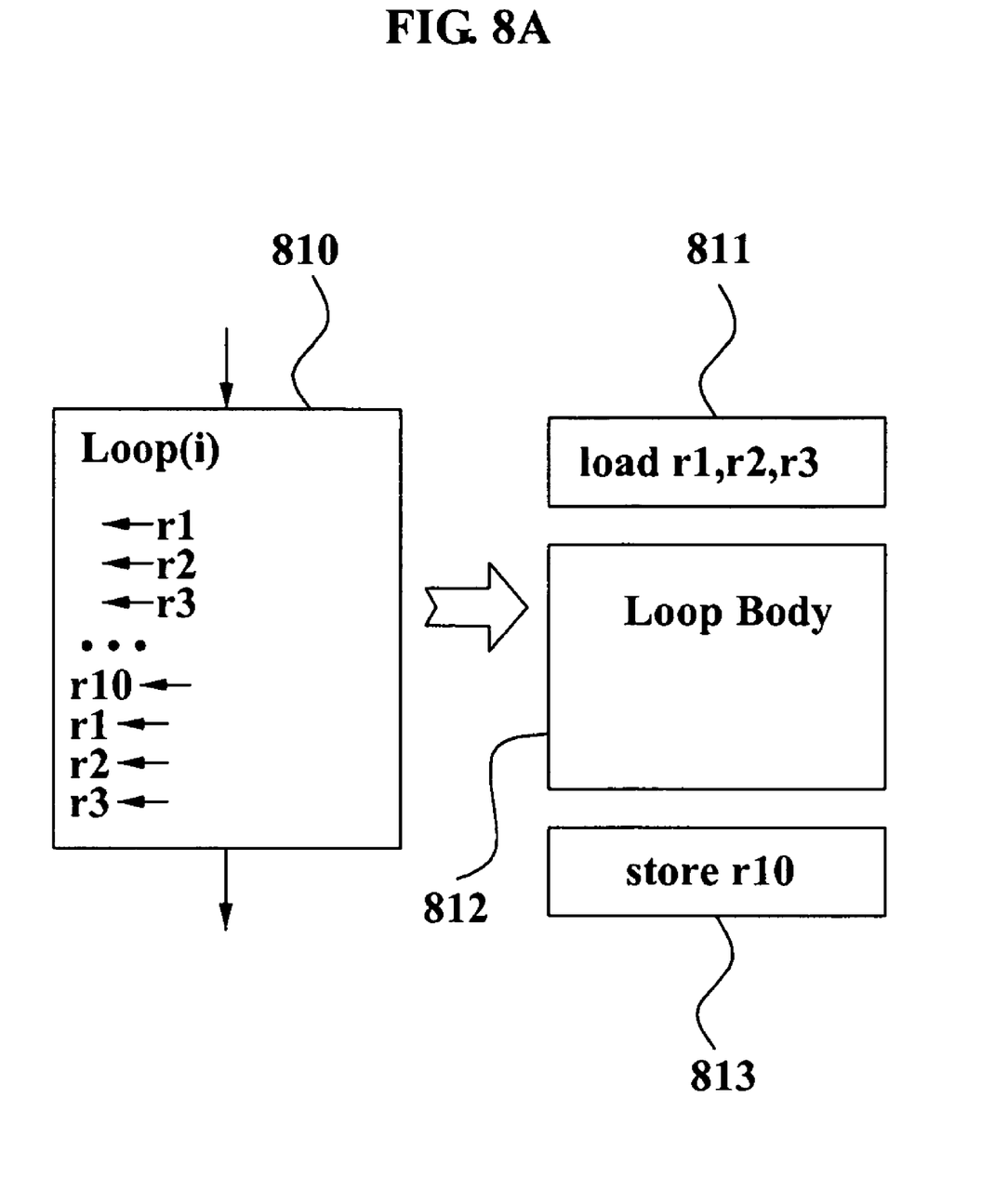
FIGS. 8A and 8B are diagrams illustrating an example of dividing each sub-loops into a prologue(pre-body) part, a body part, and an epilogue(post-body) part, according to an exemplary embodiment of the present invention.
Figure 8B:
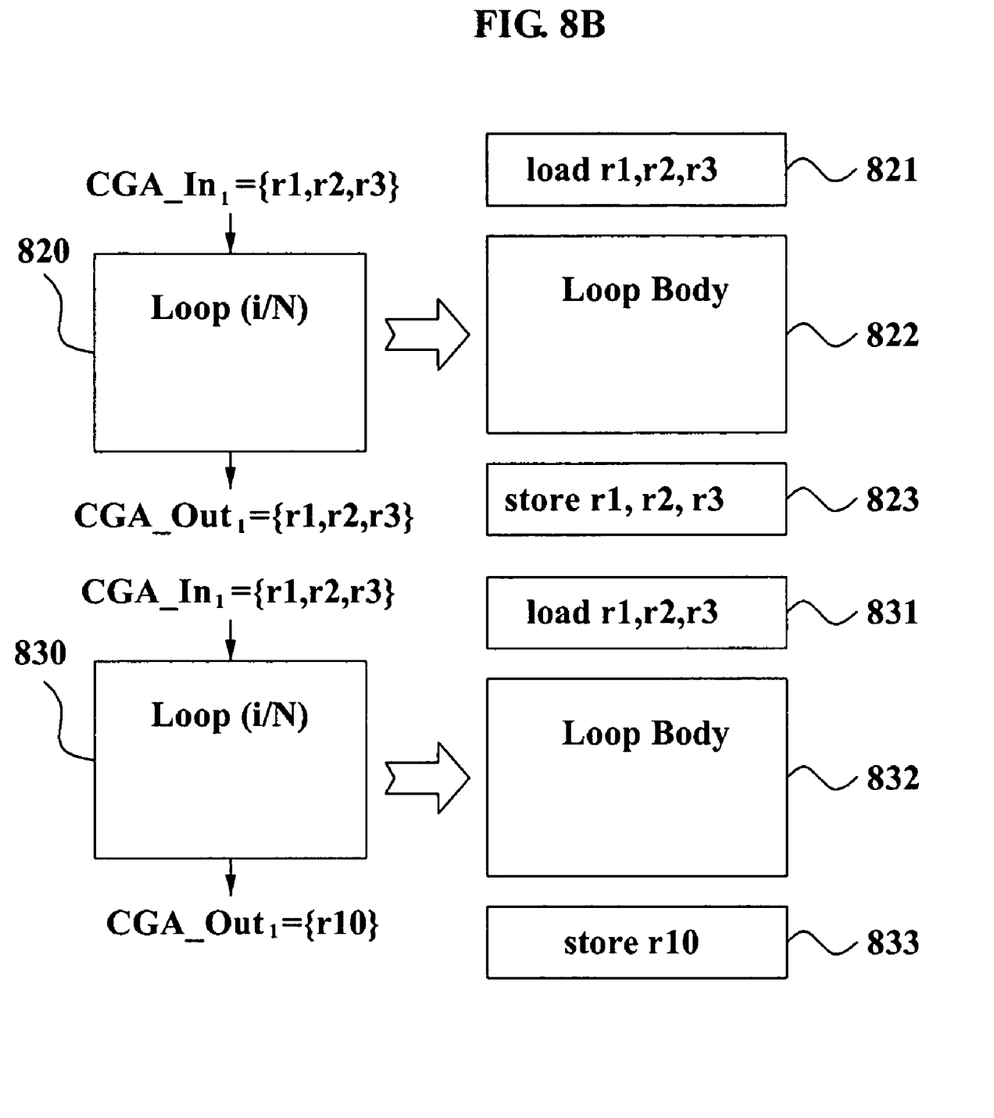

FIGS. 8A and 8B are diagrams illustrating an example of dividing each sub-loop into a prologue(pre-body) part, a body part, and an epilogue(post-body) part, according to an exemplary embodiment of the present invention.

As shown in FIG. 8A, in a prologue part 811, an operation of loading data to perform a repeated operation is performed. In an epilogue part 813, an operation of recording a result value of a loop operation has to be performed. As described above, one loop operation is divided into the prologue part 811 performed before a body part 812, the body part 812 executing the repeated loop operation, and the epilogue part 813 performed after the body part 812. In the prologue part 811 and the epilogue part 813, a repeated operation is not performed.

Sub-loops made by splitting the loop of FIG. 8A are shown in FIG. 8B. A sub-loop 820 is not a last sub-loop, and a sub-loop 830 is the last sub-loop. The sub-loops 820 and 830 may be divided into a prologue part, a body part, and an epilogue part. The sub-loop 820 has a prologue part 821, a body part 822, and an epilogue part 823. The sub-loop 830 has a prologue part 831, a body part 832, and an epilogue part 833.

Accordingly, a configuration for executing the sub-loop 820 includes a sub-configuration for executing the prologue part 821, a sub-configuration for executing the body part 822, and a sub-configuration for executing the epilogue part 823. Namely, a configuration for executing one sub-loop has at least one sub-configuration. The sub-loop 820 is one of the sub-loops which are not the last sub-loop. The sub-loops which are not the last, from first sub-loop to N-1th sub-loop, all use a configuration identical with the configuration of the sub-loop 820.

In the present exemplary embodiment, the configuration for executing one sub-loop includes at least one sub-configuration. A sub-configuration commonly used as the configuration with respect to each of a plurality of the sub-loops is stored in the same location of a configuration memory. Namely, if sub-configurations of the first sub-loop are identical to sub-configurations of a second sub-loop, the sub-configurations are stored in the same location of the configuration memory.

The sub-loop 830 is the last sub-loop. Accordingly, the sub-loop 830 has a configuration different from the sub-loops which are not the last sub-loop. As shown in (b) of FIG. 8, the epilogue part 833 of the last sub-loop 830 is different from the epilogue part 823 of other sub-loops. However, as shown in (b) of FIG. 8, the prologue part 831 and the body part 832 of the last sub-loop 830 are identical with the prologue part 821 and the body part 822 of other sub-loops. Accordingly, in the case of the configuration for the last sub-loop 830, configurations with respect to a prologue part and a body part of a last sub-loop of a loop may be identical to a prologue part and a body part of sub-loops which are not the last sub-loop of the loop.

Figure 9:
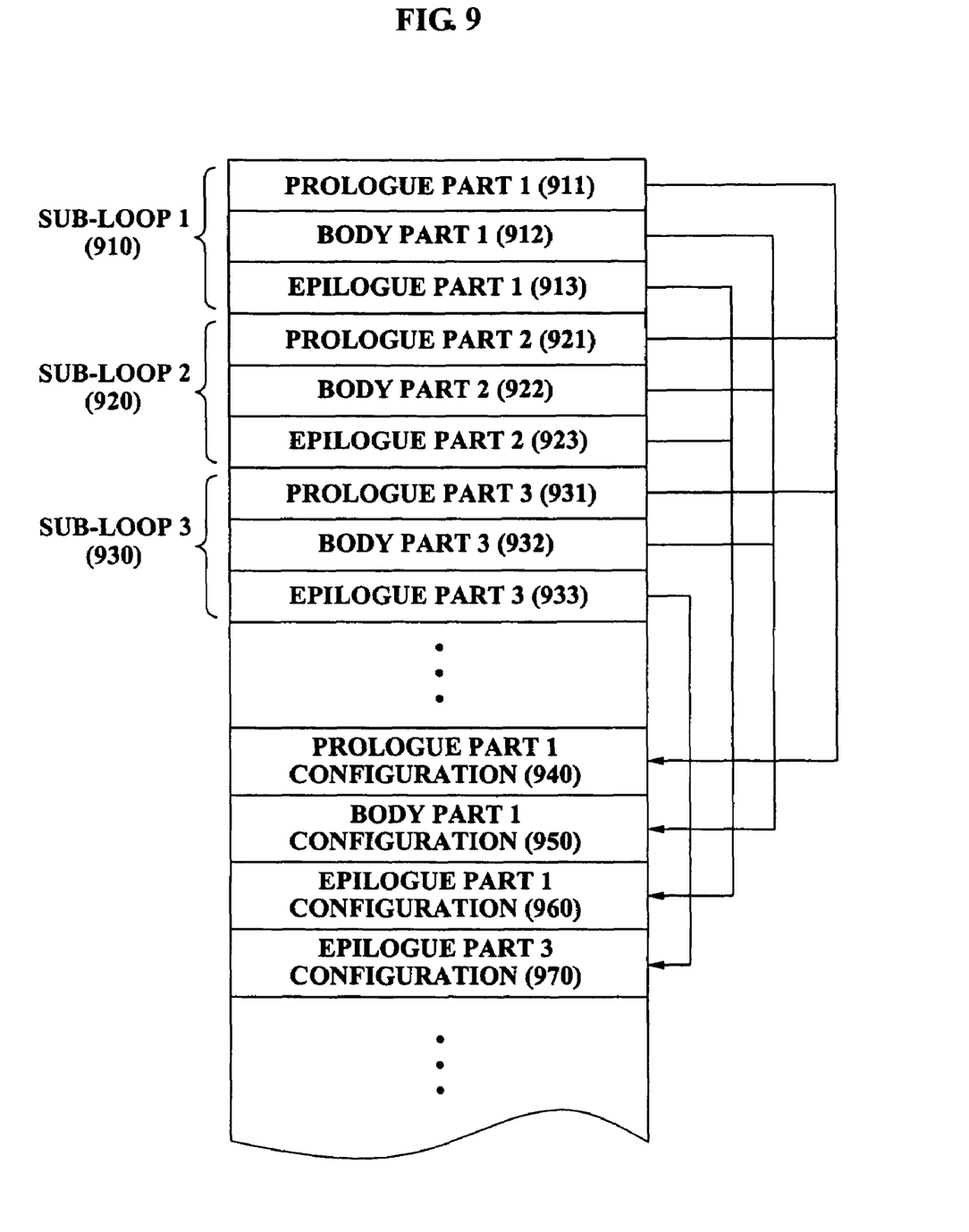
FIG. 9 is a diagram illustrating an example of a configuration memory storing configurations of sub-loops, according to an exemplary embodiment of the present invention.

FIG. 9 is a diagram illustrating an example of a configuration memory storing configurations of sub-loops, according to an exemplary embodiment of the present invention.

A sub-loop 1 910 and a sub-loop 2 920 are not a last sub-loop. A sub-loop 3 930 is the last sub-loop. Pointers with respect to a configuration for executing the sub-loop 1 910 are recorded in a prologue part 1 911, a body part 1 912, and an epilogue part 1 913. The prologue part 1 911 points a prologue part 1 configuration 940. The body part 912 points a body part 1 configuration 950. The epilogue part 1 913 points an epilogue part 1 configuration 960. A pointer with respect to a configuration for executing the sub-loop 2 920 is recorded in a prologue part 2 921, a body part 2 922, and an epilogue part 2 923. The prologue part 2 921 points the prologue part 1 configuration 940, the body part 2 922 points the body part 1 configuration 950, and the epilogue part 2 923 points the epilogue part 1 configuration 960. Namely, it is known that the sub-loops 910 and 920 which are not the last sub-loop share the same configuration.

Pointers with respect to a configuration for executing the sub-loop 3 930 that is the last sub-loop is recorded in a prologue part 3 931, a body part 3 932, and an epilogue part 3 933. The prologue part 3 931 points the prologue part 1 configuration 940, the body part 3 932 points the body part 1 configuration 950, and the epilogue part 3 933 points an epilogue part 3 configuration 970. Namely, the last sub-loop, sub-loop 3 930, does not share an epilogue part configuration with the sub-loops 910 and 920 which are not the last sub-loop but shares a prologue part configuration and a body part configuration. As described above, according to the present exemplary embodiment, since common configurations are shared with respect to configurations that increased in number due to a loop split, a required amount of configuration memory is not significantly increased.

In the above, a case in which a coarse grained array is tightly-coupled has been described. However, the present invention may be applied to a loosely-coupled configuration as well as other reconfigurable architectures including the coarse grained array.

According to an aspect of the present invention, there is provided a processor including a coarse grained array, which satisfies a real-time constraint of processing request occurs an interrupt request occurs when a loop is being executed in a coarse grained array.

According to an aspect of the present invention, a small amount of data is stored in a memory though an interrupt to be processed requires a context switch, thereby reducing an overhead occurring in a context switching of a processor including a coarse grained array.

According to an aspect of the present invention, an amount of data that has to be stored in a context switching is maintained to be small, thereby maintaining an overhead of a context switching to be at a certain level regardless of a size of the coarse grained array.

According to an aspect of the present invention, sizes of configurations increased due to splitting a loop executed in a coarse grained array into a plurality of sub-loops are minimized, thereby reducing a size of a configuration memory additionally required for storing configurations of the sub-loop.

According to an aspect of the present invention, since a number of configurations increased due to loop split is not significant, an amount of overhead due to an increase of a number of sub-loops is very small.

According to an aspect of the present invention, since a loop is split, when an interrupt request occurs while a sub-loop is executed in a coarse grained array, though the interrupt request is processed after execution of the sub-loop is completed, a real-time constraint of the interrupt may be satisfied. Also, since loop operations currently performed are not invalidated, wasting a computing power is prevented.

According to an aspect of the present invention, since common configurations can be shared with respect to configurations increased due to loop split, an amount of a required configuration memory is not increased significantly.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A processor comprising:
a reconfigurable coarse grained array comprising a plurality of function units and a plurality of register files,
wherein a loop to be executed by the coarse grained array is divided into a plurality of sub-loops, and if an interrupt request occurs while executing a sub-loop of the plurality of sub-loops in the coarse grained array, an interrupt corresponding to the interrupt request is processed after the executing of the sub-loop is completed.

2. The processor of claim 1, further comprising a storage device which located outside of the coarse grained array and stores a result value of the executing of the sub-loop after the executing of the sub-loop is completed.

3. The processor of claim 1, wherein, if a context switching is required for processing the interrupt, a result value of the executing of the sub-loop is stored into a memory located outside the coarse grained array and the interrupt is processed after completing the executing of the sub-loop.

4. The processor of claim 1, further comprising a configuration memory which stores information associated with a configuration of the coarse grained array.

5. The processor of claim 4, wherein the configuration memory stores configurations for executing the plurality of sub-loops in order for the coarse grained array to execute the plurality of sub-loops.

6. The processor of claim 5, wherein:
a configuration for executing one of the plurality of sub-loops comprises at least one sub-configuration that is commonly used for executing at least two of the plurality of sub-loops; and
the at least one sub-configuration is stored in the configuration memory.

7. The processor of claim 5, wherein a same configuration is commonly used for executing sub-loops of the plurality of sub-loops that are not a last sub-loop of the loop.

8. The processor of claim 7, wherein:
each of the plurality of sub-loops is divided into a body part for executing an iterated loop operation, a prologue part for execution before the body part, and an epilogue part for execution after the body part; and
a configuration with respect to the prologue part and the body part of the last sub-loop of the loop is shared as a configuration with respect to the prologue part and the body part of the sub-loops of the plurality of sub-loops that are not the last sub-loop of the loop.

9. The processor of claim 4, wherein:
the plurality of function units of the coarse grained array execute according to the information associated with the configuration of the coarse grained array stored the configuration memory in an array mode; and
predetermined function units selected from the plurality of function units of the coarse grained array are executed in an instruction set processor mode.

10. The processor of claim 1, wherein a number of the plurality of sub-loops is determined so that a period of time required for executing each of the sub-loops is not longer than a period of time required from the occurrence of the interrupt request to processing the interrupt.

11. The processor of claim 1, wherein each of the plurality of function units performs calculations and each of the plurality of register files is an aggregate of registers and temporarily stores data used in a corresponding function unit of the plurality of function units.

12. The processor of claim 1, wherein the loop includes a number of iterations, and each of the plurality of sub-loops includes a number of iterations, and wherein the total number of iterations of the plurality of sub-loops is equivalent to the number of iterations of the loop.

13. The processor of claim 1, wherein the loop comprises at least one operation repeatedly executed in the coarse grained array over a number of iterations.

14. The processor of claim 1, wherein the loop includes at least one operation and each of the plurality of sub-loops includes at least one operation, and
wherein each operation within the loop is identical to each operation in each of the plurality of sub-loops.

15. A processor comprising:
a reconfigurable coarse grained array comprising a plurality of function units and a plurality of register files,
wherein, if an interrupt request occurs while executing a loop in the coarse grained array and a number of iterations left to complete the executing of the loop is less than a predetermined number, an interrupt corresponding to the interrupt request is processed after the executing of the loop is completed.

16. The processor of claim 15, wherein each of the plurality of function units performs calculations and each of the plurality of register files is an aggregate of registers and temporarily stores data used in a corresponding function unit of the plurality of function units.

17. The processor of claim 15, wherein the processor comprises a plurality of processing units having a function unit of the plurality of function units and a corresponding register file comprising an aggregate of registers which store data used in the corresponding function unit of the plurality of function units.

18. The processor of claim 15, wherein a data path exists directly between a function unit of the plurality of function units and at least one other function unit of the plurality of function units.

19. The processor of claim 15, wherein a data path exists directly between a register file of the plurality of register files and at least one other register file of the plurality of register files.

20. A processor comprising:
a reconfigurable coarse grained array comprising a plurality of function units and a plurality of register files,
wherein, if an interrupt request occurs while executing a loop in the coarse grained array and a number of iterations left to complete the executing of the loop is more than a predetermined number, the executing of the loop is suspended and an interrupt corresponding to the interrupt request is processed.

21. The processor of claim 20, wherein each of the plurality of function units performs calculations and each of the plurality of register files is an aggregate of registers and temporarily stores data used in a corresponding function unit of the plurality of function units.

22. A method of processing an interrupt in a reconfigurable coarse grained array, the method comprising:
dividing a loop to be executed by the coarse grained array into a plurality of sub-loops; and
processing an interrupt corresponding to an interrupt request that occurs while executing the plurality of sub-loops in the coarse grained array after the executing of the plurality of sub-loops is completed.

23. The method of claim 22, wherein, the processing of the interrupt comprises:
storing a result value of the executing of the plurality of sub-loops in a central register file located outside the coarse grained array after the executing of the plurality of sub-loops is completed; and
processing the interrupt.

24. The method of claim 22, wherein the processing of the interrupt comprises:
determining whether a context switching is required for the processing of the interrupt; and
storing a result value of the executing of the plurality of sub-loops in a memory located outside the coarse grained array after the executing of the plurality of sub-loops and the processing of the interrupt are completed, if it is determined that the context switching is required for the processing of the interrupt.

25. The method of claim 22, wherein a number of the plurality of sub-loops is determined to satisfy a real-time constraint of the interrupt.

26. The method of claim 22, further comprising storing configurations for executing the plurality of sub-loops in a configuration memory in order for the coarse grained array to execute the plurality of sub-loops.

27. The method of claim 26, wherein:
a configuration for executing one of the sub-loops of the plurality of sub-loops comprises at least one sub-configuration that is commonly used for executing at least two of the plurality of sub-loops; and
the at least one sub-configuration is stored in the configuration memory.

28. The method of claim 26, wherein a same configuration is commonly used for executing sub-loops of the plurality of sub-loops that are not a last sub-loop of the loop and is stored in the configuration memory.

29. The processor of claim 28, wherein:
each of the plurality of sub-loops is divided into a prologue part loading data, a body part executing a loop operation, and an epilogue part recording a result value of the executing of the loop; and
a configuration with respect to the prologue part and the body part of the last sub-loop of the loop is shared as a configuration with respect to the prologue part and the body part of the sub-loops that are not the last sub-loop of the loop.

30. The processor of claim 22, wherein the coarse grained array comprises a plurality of function units and a plurality of register files, each of the plurality of function units performs calculations and each of the plurality of register files is an aggregate of registers and temporarily stores data used in a corresponding function unit of the plurality of function units.

* * * * *